(12) United States Patent
Geidel et al.

(10) Patent No.: US 10,523,068 B2
(45) Date of Patent: Dec. 31, 2019

(54) STATOR FOR AN ELECTRIC MACHINE AND ELECTRIC MACHINE

(71) Applicant: ZF Friedrichshafen AG, Friedrichshafen (DE)

(72) Inventors: Klaus Geidel, Stadtlauringen (DE); Matthias Weidner, Wasserlosen (DE); Alexander Schäflein, Ochsenfurt (DE); Matthias Cudok, Ritschenhausen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 430 days.

(21) Appl. No.: 15/302,357

(22) PCT Filed: Mar. 12, 2015

(86) PCT No.: PCT/EP2015/055122
§ 371 (c)(1),
(2) Date: Oct. 6, 2016

(87) PCT Pub. No.: WO2015/154936
PCT Pub. Date: Oct. 15, 2015

(65) Prior Publication Data
US 2017/0033621 A1 Feb. 2, 2017

(30) Foreign Application Priority Data
Apr. 9, 2014 (DE) .......................... 10 2014 206 845

(51) Int. Cl.
*H02K 1/20* (2006.01)
*H02K 5/20* (2006.01)
*H02K 9/19* (2006.01)
*H02K 1/18* (2006.01)

(52) U.S. Cl.
CPC ............... *H02K 1/20* (2013.01); *H02K 1/185* (2013.01); *H02K 5/20* (2013.01); *H02K 9/19* (2013.01); *H02K 2203/09* (2013.01); *Y02T 10/641* (2013.01)

(58) Field of Classification Search
CPC ............ H02K 1/20; H02K 1/185; H02K 5/20; H02K 9/19; H02K 2203/09; Y02T 10/641
USPC .......................................................... 310/59
See application file for complete search history.

(56) References Cited

U.S. PATENT DOCUMENTS

| 4,102,040 | A  | 7/1978 | Rich |
| 8,203,240 | B2 | 6/2012 | Hoshino et al. |
| 8,395,287 | B2 | 3/2013 | Bradfield |
| 8,405,262 | B1 | 3/2013 | Beatty et al. |

(Continued)

FOREIGN PATENT DOCUMENTS

| DE | 10 2008 001 622 A1 | 11/2009 |
| DE | 10 2009 034 235 A1 | 2/2011 |

(Continued)

*Primary Examiner* — Forrest M Phillips
(74) *Attorney, Agent, or Firm* — Cozen O'Connor

(57) ABSTRACT

A stator of an electric machine for a hybrid vehicle or electric vehicle includes: a substantially cylinder-jacket-shaped, axially extending stator carrier. The stator carrier is configured to carry a lamination stack having a plurality of stator teeth substantially annularly arranged and has a radially inwardly extending shoulder edge configured so as to axially support the lamination stack. At least one cutout is formed at the shoulder edge of the stator carrier.

18 Claims, 6 Drawing Sheets

(56) References Cited

U.S. PATENT DOCUMENTS

| | | |
|---|---|---|
| 8,427,019 B2 | 4/2013 | Garriga et al. |
| 8,502,424 B2 | 8/2013 | Esse |
| 2008/0098768 A1* | 5/2008 | Masoudipour ........ F25B 31/006 62/505 |
| 2009/0184591 A1* | 7/2009 | Hoshino .................. H02K 3/24 310/54 |
| 2011/0273040 A1* | 11/2011 | Chamberlin ............. H02K 1/32 310/59 |
| 2012/0062055 A1 | 3/2012 | Murakami et al. |
| 2013/0076171 A1* | 3/2013 | Lepres .................... H02K 1/20 310/59 |
| 2013/0169080 A1* | 7/2013 | Salamah ................. H02K 5/15 310/59 |
| 2013/0169081 A1* | 7/2013 | Grillenberger ........ H02K 1/276 310/59 |
| 2013/0278092 A1* | 10/2013 | Coldwate ................ H02K 1/20 310/59 |
| 2013/0342050 A1* | 12/2013 | Duesing .................. H02K 5/08 310/59 |
| 2014/0015356 A1 | 1/2014 | Chamberlin |
| 2014/0054990 A1* | 2/2014 | Nordlund ................. H02K 1/32 310/59 |
| 2014/0265665 A1* | 9/2014 | Maynez ................... H02K 9/06 310/59 |
| 2014/0265666 A1* | 9/2014 | Shoykhet ................ H02K 1/20 310/59 |
| 2016/0111923 A1* | 4/2016 | Bushen .................... H02K 1/20 310/59 |
| 2016/0118862 A1* | 4/2016 | Maki-Ontto ............. H02K 9/02 310/59 |
| 2016/0197526 A1* | 7/2016 | Fan .......................... H02K 1/20 62/505 |

FOREIGN PATENT DOCUMENTS

| | | |
|---|---|---|
| DE | 10 2011 103 336 A1 | 11/2012 |
| DE | 10 2012 023 320 A1 | 6/2013 |
| EP | 1 921 402 A2 | 5/2008 |

\* cited by examiner

STATOR FOR AN ELECTRIC MACHINE AND ELECTRIC MACHINE

CROSS-REFERENCE TO RELATED APPLICATIONS

This is a U.S. national stage of application No. PCT/EP2015/055122, filed on 12 Mar. 2015, which claims priority to the German Application No. 10 2014 206 845.2, filed 9 Apr. 2014, the content of both incorporated herein by reference.

BACKGROUND OF THE INVENTION

1. Field of the Invention

The present invention is directed to a stator of an electric machine, particularly for a hybrid vehicle or electric vehicle, with a substantially cylinder-jacket-shaped, axially extending stator carrier, which stator carrier carries a lamination stack with a plurality of stator teeth which are substantially annularly arranged and has a radially inwardly extending shoulder edge which serves as axial support for the lamination stack.

2. Related Art

As is known from the art, a stator of the type mentioned above is used particularly for electric machines, for example, electric motors or generators. Electric motors or generators of this type have a stationary component part (stator) and a component part (rotor) that rotates relative to the stator. The stator is generally fixedly arranged at a housing. Electric machines of this type are used particularly in electric vehicles or hybrid vehicles, which have an advantage over conventional vehicles with regard to energy consumption. However, the electric motors or generators used in electric vehicles or hybrid vehicles of this type must deliver high outputs and torques, which entails high waste heat through resistive losses in the stators. To prevent any damage resulting from this waste heat, it is customary to arrange at least one cooling system at the stator so that the waste heat can be dissipated. In this respect, a distinction is usually made between active cooling, in which a coolant is actively guided, via additional elements, to the stator, and passive cooling systems in which, for example, a coolant that is already being used for the clutch is guided outward to the stator via centrifugal forces.

DE 10 2008 001 622, for example, discloses an active cooling system in which coolant is sprayed directly on the stator or stator coil windings via coolant nozzles. It is also known to guide coolant through coolant channels additionally formed at the stator so as to dissipate waste heat as is disclosed, for example, in DE 10 2011 103 336. In passive cooling systems, as mentioned above, coolant that is used, for example, to cool an internal clutch or a rotor, and is carried outward by centrifugal forces, is also used to cool the stator.

In both systems, the coolant, after passing the stator, usually impinges on the housing wall and runs down it to a coolant trough. Further, by impinging against the walls of the housing, the coolant is defoamed so that the coolant can easily drain into the coolant trough.

However, a disadvantage in all of the coolant systems known from the prior art consists in that, particularly in the region of the coolant trough, coolant removal is often insufficient because more coolant enters the coolant trough than is drained off. Although an overflow opening that can remove excess coolant is known from the prior art, it is not designed to provide continuous removal of coolant. Further, an overall increase in the coolant throughput in the entire system, for example, to compensate load maxima, is impossible.

SUMMARY OF THE INVENTION

Therefore, it is an object of the present invention to provide for an efficient cooling of the stator of an electric machine, which allows a high throughput of coolant.

According to an aspect of the invention, a stator of an electric machine is provided, particularly for a hybrid vehicle or electric vehicle, with a substantially cylinder-jacket-shaped, axially extending stator carrier, which stator carrier carries a lamination stack with a plurality of stator teeth, which are substantially annularly arranged and has a shoulder edge which extends radially inward and which serves as axial support for the lamination stack. To provide improved cooling of the stator lamination stack and a removal of coolant specifically in the region of the stator, at least one cutout is formed at the shoulder edge of the stator carrier. Since it is precisely the shoulder region of the stator carrier that forms a significant barrier for a deliberate removal of coolant, the cutouts are suitable for facilitating the removal of coolant through the stator, which in turn allows a higher coolant throughput.

According to a further advantageous embodiment example, the lamination stack can be formed as individual, substantially annularly arranged stator segments, and one or more stator teeth are formed at each stator segment, or the lamination stack can also be formed as an integral component part. In so doing, it is particularly advantageous when at least one substantially axially extending groove is arranged at at least one stator tooth. In particular when the lamination stack is formed of segments, this groove is already present at the stator tooth. It provides a spring effect for the stator tooth, which is necessary for arranging the segments in a substantially annular stack without the segments snagging on one another. In the prior art, however, when the lamination stack has been assembled, this groove has no further object. It is suggested that this groove be used in an advantageous manner as coolant guide to transport coolant from one axial side of the stator to the other axial side of the stator. At the same time, a groove of this type can be incorporated in a simple manner in integral lamination stacks.

Further, when an axially arranged groove is provided for guiding coolant through the stator carrier, it is advantageous when the cutout at the shoulder edge of the stator carrier is arranged in the region of the substantially axially arranged groove of the stator tooth so that coolant can exit freely from the axially arranged groove without being blocked by the shoulder edge of the stator carrier.

According to a further advantageous embodiment example, the at least one cutout is arranged at the shoulder edge of the stator carrier in a lower area of the stator. Within the scope of the entire present description, the word "lower" in this respect is meant geodetically. Accordingly, in an installed state of the electric machine this means a region around the 6 o'clock position. Since coolant is usually removed from the stator particularly in the region of the coolant trough in the lower area of the stator, but the constructional conditions in this case at the same time also prevent a sufficient removal of coolant, the suggested constructions allow a deliberate and sufficient removal of coolant from the stator area. On the other hand, if the coolant discharge is insufficiently dimensioned, temperature differences occur in the coolant trough on the one hand and, on the other hand, an amount of coolant sufficient to dissipate the existing waste heat cannot be put through. While an overflow opening can be provided in the lower area of the stator, it is usually arranged in such a way that the rotor is already too deeply immersed in the coolant and, as a result of an excessively high coolant level, splashing occurs—i.e., the rotor is immersed too deeply in the coolant—which in turn brings about drag losses. On the other hand, a sufficient removal of coolant in the lower area of the stator ensures a higher coolant throughput without drag losses so that a more efficient cooling is provided for the stator and also for the electric machine.

According to a further embodiment example, the stator carrier has, at least in the area of the cutout, a discharge channel arranged axially outside with respect to the lamination stack extends at least partially radially outward and is constructed to fluidically contact the cutout. Owing to the fact that the stator usually extends axially to the next component element, coolant can flow lateral to the stator only poorly in direction of a location of coolant discharge from the electric machine or stator. Although the cutouts in the shoulder edge of the stator carrier disclosed herein allow a good coolant throughput through the stator, the discharge channel axially outside of the stator carrier can additionally ensure that sufficient coolant can discharge radially outward from the stator. The discharge channel can extend annularly around the stator, but it is also possible that the discharge channel is arranged only in a lower area of the stator in the vicinity of the coolant discharge point.

Further, it can be advantageous when the stator carrier has, in its lower area at its radially outer edge, a discharge opening through which coolant can be guided out of the electric machine in direction of a coolant collecting point arranged in the housing. From this coolant collecting point, coolant can be moved in turn to a coolant reservoir in which it is cooled and from which it is supplied again to the coolant circuit. The discharge opening in the stator carrier is advantageously dimensioned such that coolant can be sufficiently removed from the electric machine.

According to a further advantageous embodiment example, the discharge channel is fluidically connected to at least one of the cutouts at the shoulder edge of the stator carrier on the one hand and to the discharge opening at the radially outer lower edge of the stator carrier on the other hand. In this way, it can be ensured that coolant that flows through the stator can be removed from the stator in sufficient quantity without the coolant flow becoming backed up by adjoining component parts.

Further, according to another advantageous embodiment example, a switching ring receptacle is arranged at the stator, which switching ring receptacle has radially outwardly in the region of the shoulder edge of the stator carrier at least one partial area offset axially outwardly from the stator, the partial area preferably being formed as a notch. Since the stator and switching ring receptacle are arranged so as to abut one another particularly in the area of the switching ring receptacle, a coolant flow can take place between them only to a very limited extent. The notch formed at the switching ring receptacle or the partial area offset axially outwardly ensures that coolant can be removed from the stator radially outwardly. In this regard, it is particularly preferable when the axially outwardly offset partial area is arranged in the region of the substantially axially extending groove of the stator tooth. Since a large portion of the coolant is removed via the axially extending groove and via the cutout in the shoulder edge of the stator carrier, it is particularly advantageous when the recessed partial area is also arranged in this region.

Alternatively or in addition, however, it is also possible to form the entire radially outermost switching ring receiving pocket of the switching ring receptacle such that it is arranged so as to be offset axially outwardly so that a coolant drain gap is formed around the stator between the stator and switching ring receptacle.

According to a further advantageous embodiment example, a retaining ring can be provided on the side of the stator carrier remote of the shoulder edge for axially securing the lamination stack, which retaining ring has at least one opening arranged in the area of the substantially axially arranged groove of the stator tooth. Usually, an axial support is also necessary at the other side for fastening the lamination stack to the stator carrier. For reasons pertaining to assembly, this axial support is mostly carried out via a retaining ring that secures the lamination stack to the stator carrier in a press fit. In order nevertheless to allow an exchange of coolant through the stator, it is advantageous when at least one opening is formed in the retaining ring through which coolant can flow into the groove arranged at the stator tooth and can be guided from there in direction of the coolant discharge.

The flow of coolant made possible via the diverse channels and openings can be defined via the size of the openings, the depth of the grooves and/or the size and depth of the cutout. It is particularly advantageous that the retaining ring can also simply be exchanged for controlling the coolant amount in a simple manner without needing to adapt further component parts to the changed coolant flow.

A further aspect of the present invention is directed to an electric machine, particularly for a hybrid vehicle or an electric vehicle, with at least one stator and a rotor that are received in a housing. The stator has a substantially cylinder-jacket-shaped, axially extending stator carrier, which carries a lamination stack with a plurality of stator teeth which are substantially annularly arranged and which is connected to the housing so as to be fixed with respect to rotation relative to it. The stator is constructed in the manner described above.

It is further preferable when a sump trough in which a coolant is received is formed in a lower area of the housing for a coolant, and the stator is surrounded, preferably in its lower area, at least partially by the coolant received in the sump trough. This advantageous construction of a sump trough in the lower area of the housing enables an efficient cooling of the stator on the one hand and, on the other hand, at a corresponding coolant level, coolant can be distributed in the electric machine and particularly at the stator via the rotation of the rotor that receives coolant from the sump trough in its lower area, so that an efficient removal of waste heat is ensured.

According to a further advantageous embodiment example, the cutout is formed in the shoulder edge of the stator carrier and/or the substantially axially arranged groove of the stator tooth and/or the axially outwardly offset partial area of the switching ring receptacle in the region of the sump trough. Particularly in the lower area, i.e., in the region of the sump trough, it has been shown in the electric machines utilizing prior art cooling that an insufficient removal of coolant takes place because the coolant backs up between the stator and the adjoining component parts, e.g., the switching ring receptacle or an adjoining housing. On the other hand, coolant located in the sump trough on the side remote of the coolant discharge point can only be guided via the gap between rotor and stator in direction of the coolant discharge point, which leads to an unequal temperature distribution in the coolant in the sump trough. An improved removal of coolant is made possible through the above-mentioned configuration so that the coolant throughput in the electric machine can be increased on the one hand and unequal temperature distributions in the sump trough can be prevented on the other hand.

According to a further advantageous embodiment example, the cutout in the shoulder edge of the stator carrier, the substantially axially arranged groove of the stator tooth and, optionally, the opening in the retaining ring are constructed in such a way that they provide a fluid connection channel for the coolant through the stator. Accordingly, backups due to insufficient possibility for flow can also be prevented in the area of the coolant sump, and an efficient cooling of the stator can be provided at the same time.

Advantageously, a flow quantity of the coolant through the stator can be defined particularly via the opening in the retaining ring. In view of the fact that only the retaining ring need be exchanged in order to change the throughflow quantity, it is possible to adapt to changed throughflow quantities in a very simple manner.

Further, it is advantageous when there is provided at the housing, particularly in the region of the lamination stack and/or the gap between rotor and stator, at least one coolant entry point, particularly a coolant spray nozzle, which introduces coolant at a coil arranged at the stator tooth and/or in a gap which is formed between the stator and the rotor of the electric machine. A coolant entry point of this kind ensures a particularly good, efficient cooling at the stator in addition to or as an alternative to the coolant which is spun in by the centrifugal force of the rotor.

According to a further advantageous embodiment example, a coolant outlet is provided at a lowest point of the housing and is preferably in fluidic contact with the discharge opening at the stator carrier. In this way, coolant can be removed efficiently from the electric machine and supplied to a reservoir in which it is cooled and from which it is fed to the coolant circuit again.

Further advantages and advantageous embodiment forms are defined herein.

BRIEF DESCRIPTION OF THE DRAWINGS

The invention will be described in more detail in the following referring to embodiment examples shown in the drawings. In this regard, the embodiment examples are of a purely exemplary nature and shall not determine the protective scope of the application. The protective scope is defined solely through the accompanying claims. In the drawings:

DETAILED DESCRIPTION OF THE PRESENTLY PREFERRED EMBODIMENTS

Figure 1:
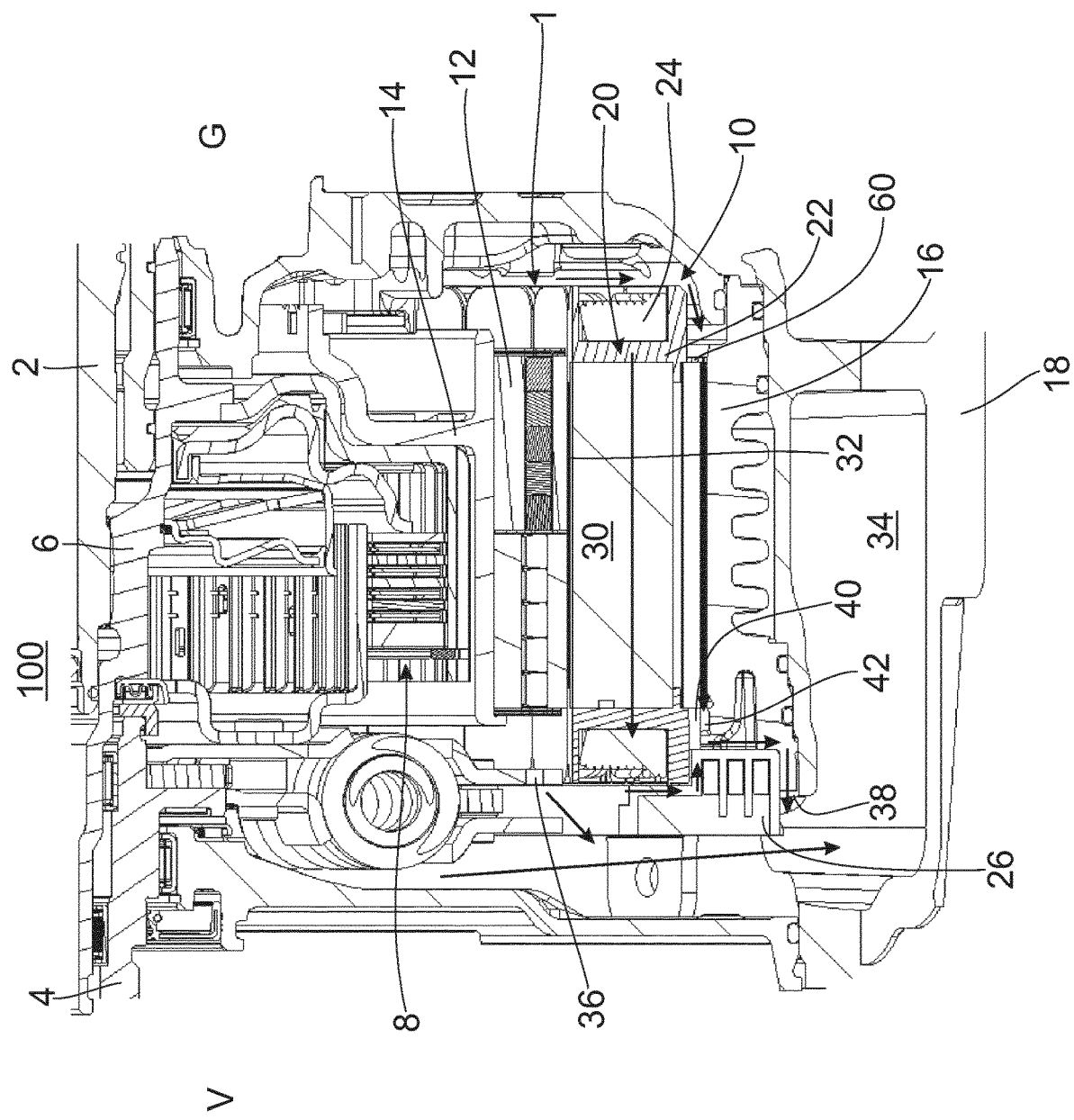
FIG. 1 is a schematic sectional view through a preferred embodiment example of an electric machine.

Like elements or functionally equivalent elements are denoted by the same reference numerals in the following.

FIG. 1 shows a schematic sectional view through a hybrid module 100. Hybrid modules 100 of this kind are used in hybrid vehicles in which an electric machine 1 is used for the drive in addition to an internal combustion engine (not shown). To enable operation by the internal combustion engine alone or in combination with the electric machine 1, or with the electric machine 1 alone, a transmission input shaft 2 is selectively connected to a motor output shaft 4 by a clutch device 8. A rotor hub 6 is usually connected to the transmission input shaft 2 so as to be fixed with respect to rotation relative to it so that a torque can be transmitted from the electric machine 1 to the transmission input shaft 2 when the clutch 8 is open.

To this end, in a known manner, the electric machine 1 has a stator 10 and a rotor 12, the rotor 12 being in turn connected to the rotor hub 6 so as to be fixed with respect to rotation relative to it via a rotor carrier 14. The stator 10 itself has a stator carrier 16, which is connected to a housing 18 so as to be fixed with respect to rotation relative to it and at the same time carries a lamination stack 20 which has, likewise in a known manner, a plurality of stator teeth 22 at which the stator coils 24 are arranged. Further, in order to power the stator 10 a switching ring receptacle 26 is arranged axially adjacent to the stator 10 on the combustion engine side in the present embodiment example, which switching ring receptacle 26 powers the stator 10 and drives the rotor 12.

Because much energy must be applied for driving a vehicle, high waste heat also occurs when operating the electric machine 1 and must be dissipated by cooling. To this end, as is further shown by FIG. 1, a coolant sump 30 is arranged in a lower area of the electric machine, this coolant sump 30 covering a lower area of the stator 10 and a portion of the rotor 12 with coolant. Accordingly, when rotating, the rotor 12 can pick up coolant from the coolant sump 30 and distribute it throughout the interior due to centrifugal force. At the same time, particularly when oil is used as coolant, the oil used for operating the clutch device 8 can also be guided to the rotor and from there onward to the stator 10 by centrifugal forces. In addition to these passive cooling arrangements, a coolant entry point, not shown, can be arranged in the area of the stator coils 24. This coolant entry point is configured to spray coolant directly on the stator coils 24 and/or into an air gap 32 arranged between rotor 12 and stator 10. The coolant distributed in the interior by the rotor 12, clutch 8 and/or coolant entry points impinges against the housing 18, flows along the housing walls and collects in the coolant sump 30 from where it drains into a coolant collecting space 34. From the coolant collecting space 34, the coolant can be fed again to a coolant reservoir (not shown) in which it is cooled and from which it is returned to the coolant circuit, i.e., to the clutch or the coolant entry points, for example.

In order to enable a sufficiently large throughput of coolant through the electric machine 1 without the coolant level in the coolant sump 30 becoming too high, which can lead to elevated drag torque at the rotor owing to splashing, an overflow opening 36 can be formed on the one hand in a disk element adjacent to the electric machine for the motor. However, this opening 36 has the disadvantage that the coolant throughput in the sump 30 itself is insufficient. On the other hand, an outlet 38 arranged in the sump itself usually has only a weak flow owing to constructional conditions.

Figure 2:
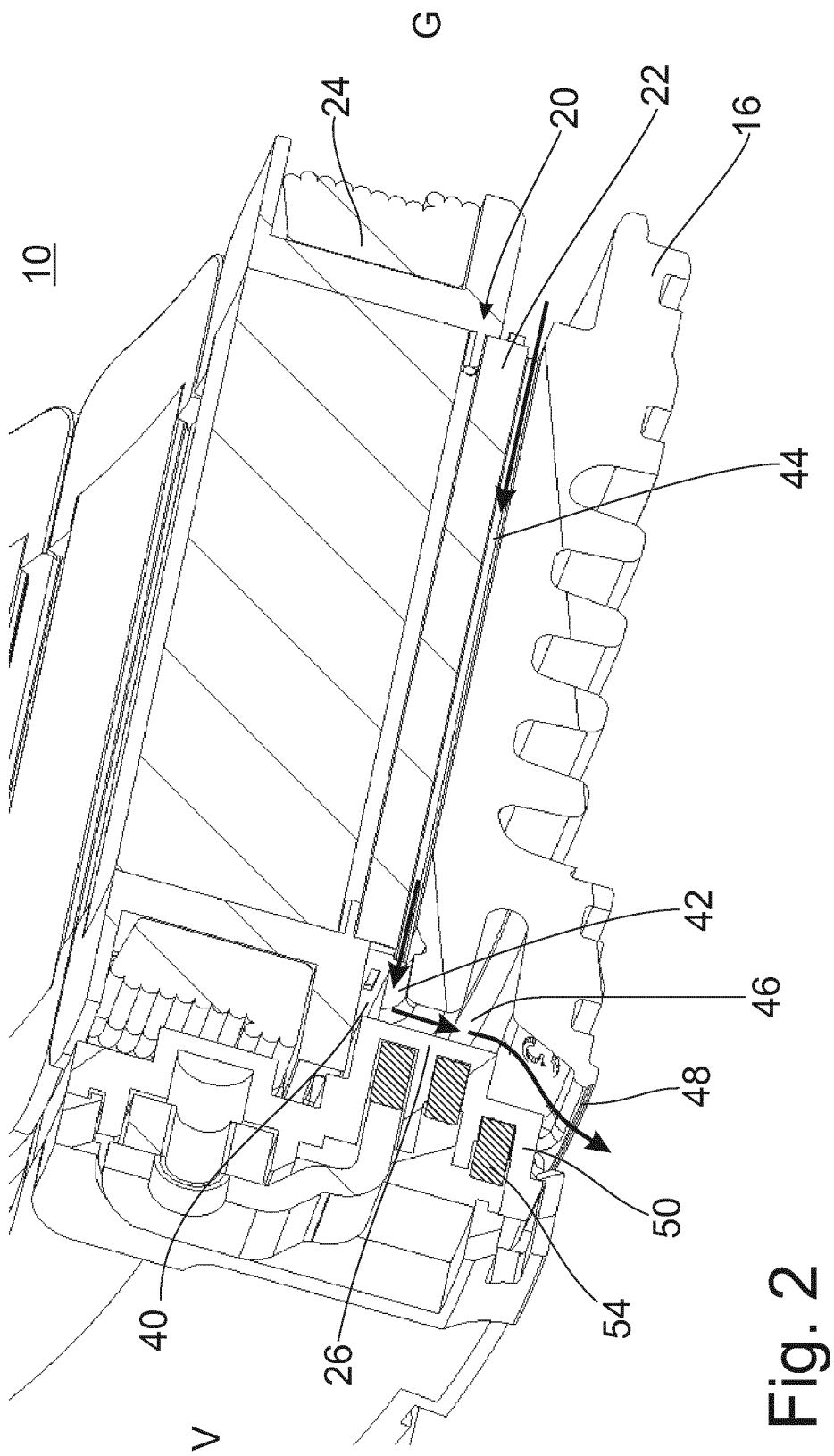
FIG. 2 is a partial perspective schematic view of a section through a preferred embodiment example of the stator.

Particularly in the area of the stator carrier 16, coolant can flow out only very poorly. One of the reasons for this is that the stator carrier 16 also axially supports the lamination stack 20 by a shoulder edge 40 as can be seen particularly from FIG. 2. FIG. 2 shows an enlarged view of the stator 10 with the stator carrier 12 and the lamination stack 20 arranged thereon. The coils 24 are in turn fastened to the lamination stack 20, and the lamination stack 20 is supported via the shoulder edge 40. Without the disclosed structural developments, this shoulder edge 40 prevents coolant from flowing freely through the stator 10. For this reason, a cutout 42 via which coolant can flow out of the stator 10 (see arrows in FIGS. 1 and 2) can be formed at the shoulder edge 40 of the stator carrier 16.

FIG. 2 further shows that the stator tooth 22 of the lamination stack 20 has a groove 44, which usually facilitates the assembly of the lamination stack 20, but at the same time, as is shown, can be used as a connecting channel for a coolant transfer from a transmission side G to the combustion engine side V of the stator. It can further be seen from FIG. 2 that the groove 44 and the cutout 42 in the shoulder edge 40 of the stator carrier 12 are in fluidic contact with one another so that coolant can be guided radially outwardly directly from the groove 44 via the cutout 42. Further to this end, a coolant discharge channel 46 can be arranged axially at the stator carrier 12 so that sufficient space is provided between the switching ring receptacle 26 and the stator carrier 12 for coolant to be guided radially outwardly to a coolant discharge opening 48 and from there into the coolant receiving space 34.

As can be seen particularly well in FIG. 1, a different configuration would lead to an appreciably narrower throughflow area for the coolant so that coolant would back up in the coolant sump 30 and a sufficient coolant throughput for a sufficient dissipation of waste heat from the electric machine is not ensured. With the configuration discussed above, however, a sufficient transporting of coolant is possible, particularly from the lower area of the stator, so that the coolant throughput can even be increased.

Figure 3:
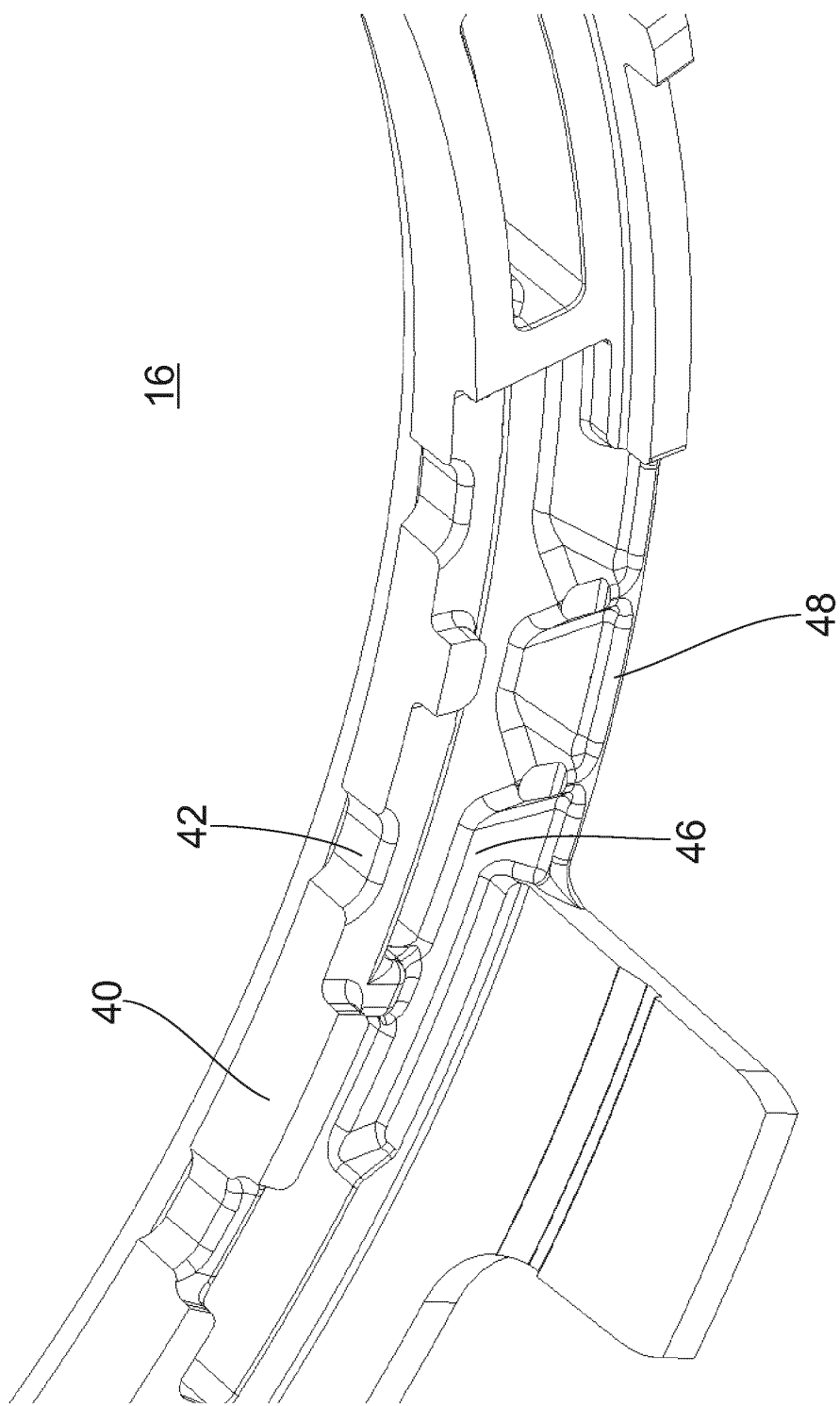
FIG. 3 is a partial perspective schematic view of a section through a preferred embodiment example of the stator carrier.

FIG. 3 shows a perspective detailed view of the stator carrier 16 from which it is particularly clear how the cutouts 42 formed in the shoulder edge 40 open into the coolant discharge channel 46 and from the latter into the discharge opening 48. Since the switching ring receptacle 26 usually directly contacts the stator 10, a passage of coolant through the stator 10 would be blocked or extremely restricted precisely in the lower area of the stator 10 if not for these special constructional configurations.

For this reason, the switching ring receptacle 26 can also be configured so as to facilitate flow at the same time in the area of the cutout 42 and coolant channel 46.

Figure 4:
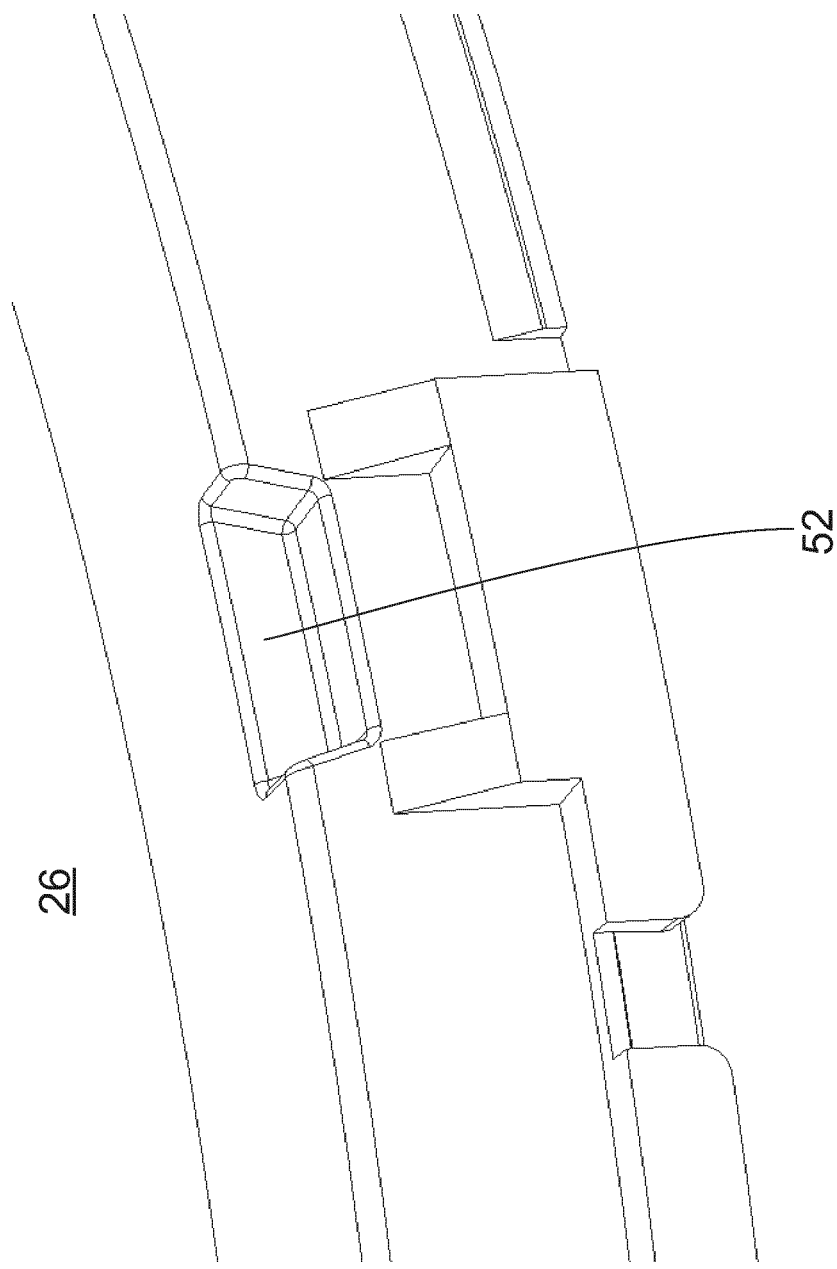
FIG. 4 is a partial perspective schematic view of a partial area of a preferred embodiment example of the switching ring receptacle.

In this regard, FIG. 2 further shows that the switching ring receptacle 26 in the region of the cutout 42 or coolant discharge opening 48 can also be structurally altered so as to enable a particularly good flowing off of coolant from the electric machine 1. To this end, the switching ring receptacle 26 has an axial offset 50 at least in a partial area. However, as can be seen more exactly from the detailed view in FIG. 4, this offset 50 can also be formed as a notch 52. Alternatively, however, the axial offset 50 can also be formed in such a way that the radially outermost switching ring 54 is arranged so as to be offset axially outwardly not only in the region of the coolant discharge opening 48 but also over the entire switching ring receptacle 26. This axial offset 50 or notch 52 at the switching ring receptacle 26 likewise provides for a better coolant discharge from the electric machine 1, which in turn optimizes the removal of heat.

Figure 5:
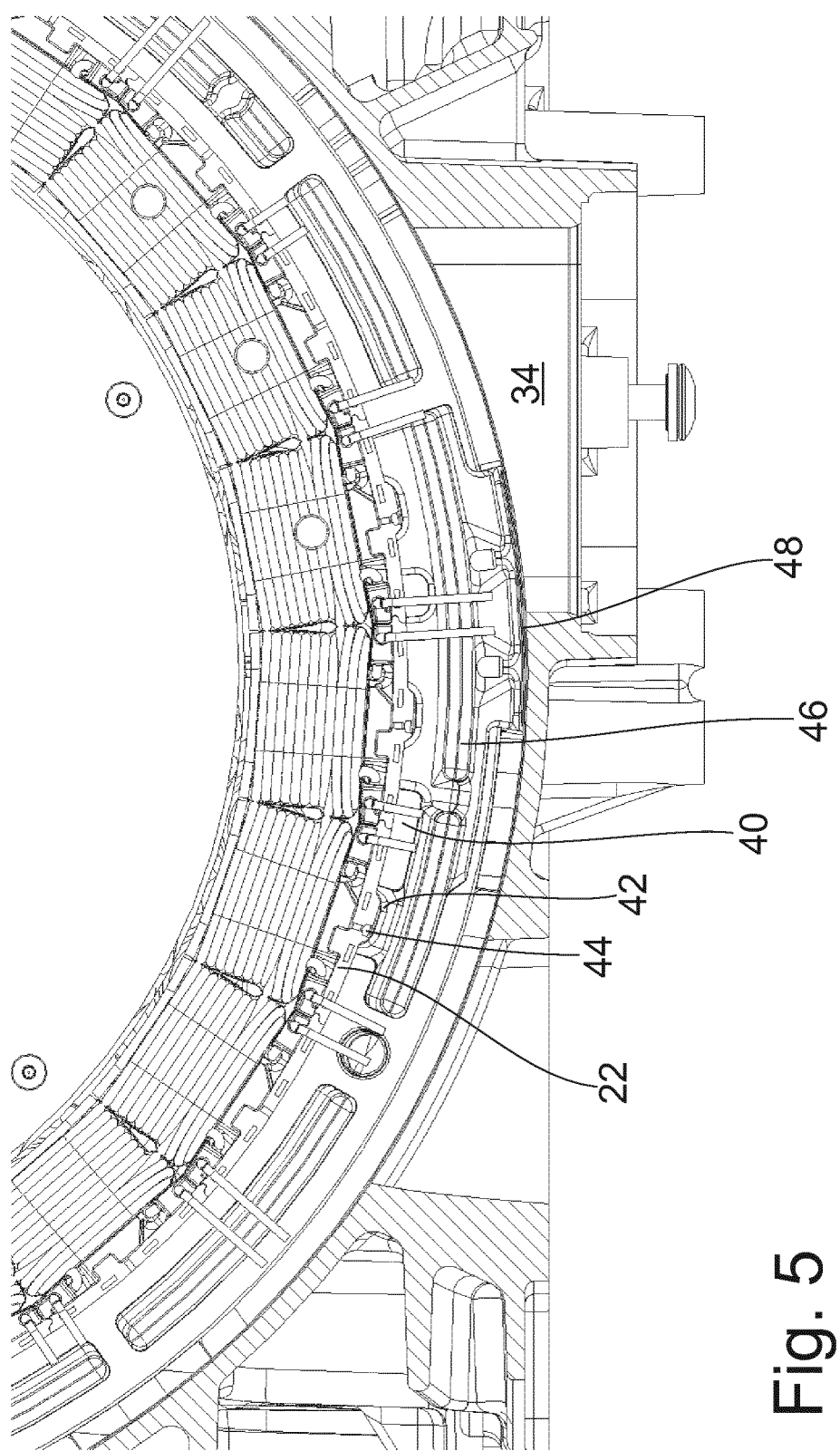
FIG. 5 is an axial top view of a partial area of the stator from the switching ring receptacle side.

FIG. 5 shows a top view of the stator 10 in axial direction without switching ring receptacle 26. It can be seen clearly how the groove 44 formed in the stator tooth 22 opens into the cutouts 42 in the shoulder area 40 of the stator carrier 16. At the same time, this top view also shows again that the coolant exiting from the grooves 44 is guided via the cutouts 42 into the coolant discharge channel 46 and from there to the discharge opening 48 and the oil catch area 34 located below the discharge opening 48.

The throughflow amount through the grooves 44 or cutouts 42 and the channel 46 can be controlled via the depth of the groove 44. However, since the groove 44 is also used for flexibility during assembly of the lamination stack 20, it must have a certain depth in order to provide a sufficient springing effect. Therefore, controlling or limiting the amount flowing through the groove 44 can be defined, for example, via a retaining ring 60 arranged at the axial end side of the stator 10 opposite the switching ring receptacle 26. A retaining ring 60 of this type is shown schematically in FIG. 1 and can be seen from the detailed top view in FIG. 6.

Figure 6:
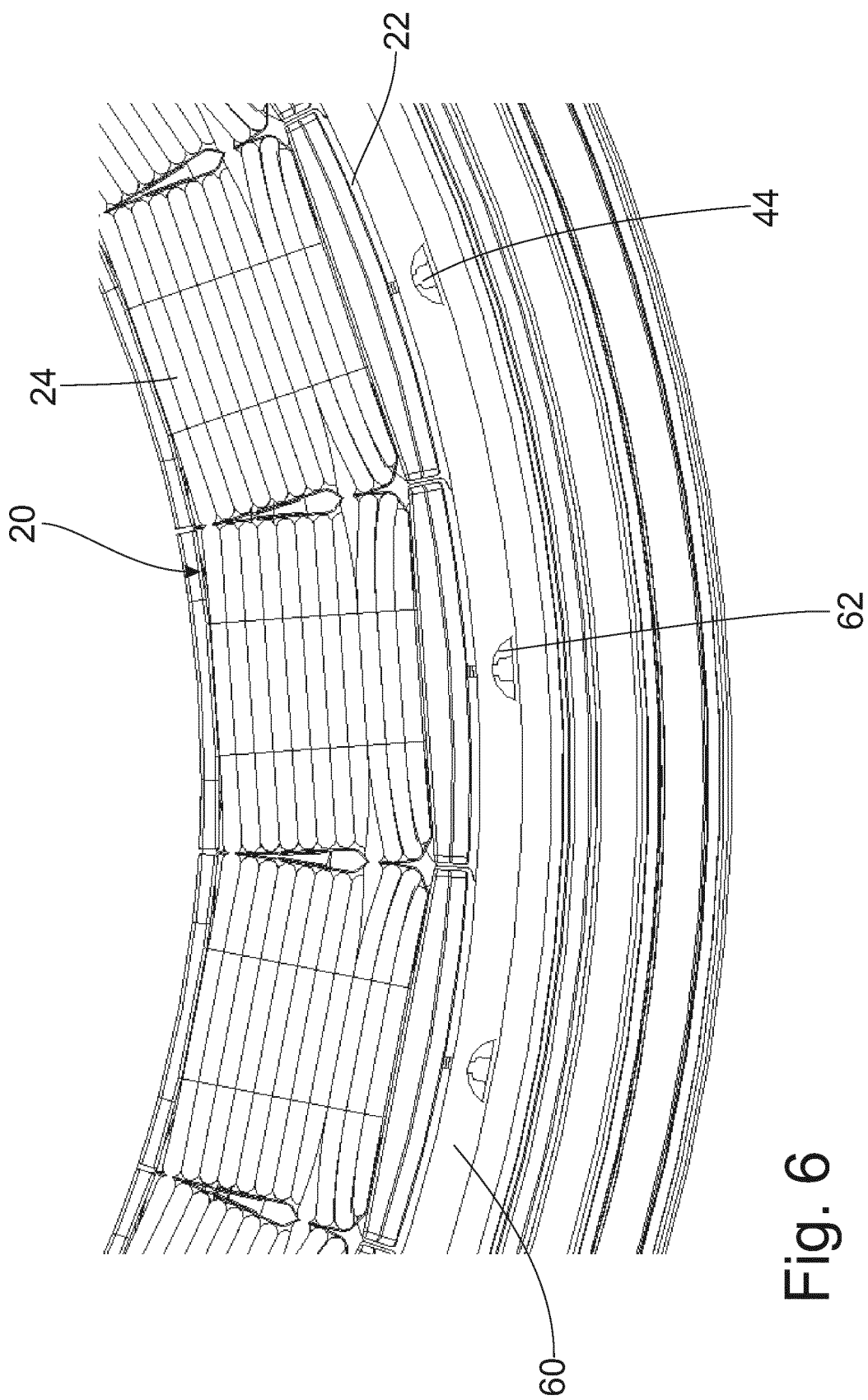
FIG. 6 is an axial top view of a partial area of the stator from the axial side of the stator remote of the switching ring receptacle.

FIG. 6 shows an axial top view of the stator from the transmission side G. The stator carrier 16 and the lamination stack 20, which is made from separate stator segments, are again shown. The grooves 44, which are formed in the stator teeth 22 and through which coolant can flow to the combustion engine side V, are shown at the stator teeth 22. The retaining ring 60 is provided for axially securing the lamination stack 20 at the stator carrier 16 also on the transmission side G and is press-fitted between stator carrier 16 and lamination stack 20.

As can further be seen from FIG. 6, the retaining ring 60 has openings 62 in the area of the grooves 44 allowing coolant to pass into the grooves 44 but also limiting the passage of coolant. In this way, the throughflow quantity of coolant through the grooves 44 can be influenced via the dimensioning of the openings 62. This is advantageous particularly because, when there is a change in the coolant entry output in the coolant circuit, for example, only the retaining ring 60 need be exchanged to adapt the coolant throughflow amount in a corresponding manner.

On the whole, the construction of the stator and electric machine according to the invention makes it possible to improve coolant discharge and accordingly to facilitate dissipation of heat from the electric machine without needing to add to structural conditions.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE CHARACTERS 100 hybrid module
1 electric machine
2 transmission input shaft
4 motor output shaft
6 rotor hub
8 clutch device
10 stator
12 rotor
14 rotor carrier
16 stator carrier
18 housing
20 lamination stack
22 stator tooth
24 coil
26 switching ring receptacle
30 coolant sump
32 air gap
34 coolant collecting space
36 overflow opening
38 coolant discharge
40 shoulder edge of the stator carrier
42 cutout in the shoulder
44 axial groove
46 coolant discharge channel
48 coolant discharge opening
50 axial offset
52 notch
54 radially outer switching ring
60 retaining ring
62 opening in the retaining ring
G transmission side
V internal combustion engine side

The invention claimed is:

1. A stator of an electric machine for a hybrid vehicle or electric vehicle, the stator comprising:
   a substantially cylinder-jacket-shaped, axially extending stator carrier, wherein the stator carrier is configured to carry a lamination stack having a plurality of stator teeth substantially annularly arranged and has a radially inwardly extending shoulder edge configured so as to axially support the lamination stack;
   at least one cutout arranged at the shoulder edge of the stator carrier; and
   at least one substantially axially extending groove arranged at at least one of the stator teeth so as to facilitate removal of coolant through the stator,
   wherein the at least one cutout is arranged at the shoulder edge of the stator carrier in an area of the at least one substantially axially arranged groove.

2. The stator according to claim 1, wherein the lamination stack comprises individual, substantially annularly arranged stator segments, and wherein one or more of the stator teeth are formed at each stator segment.

3. The stator according to claim 1, wherein the at least one cutout is arranged at the shoulder edge of the stator carrier in a lower area of the stator.

4. The stator according to claim 1, wherein the stator carrier has, at least in an area of the at least one cutout, a discharge channel that:
   is arranged axially outwardly with respect to the lamination stack,
   extends at least partially radially outwardly, and
   is configured to fluidically contact the at least one cutout.

5. The stator according to claim 4, further comprising a discharge opening arranged at the stator carrier in a lower area of the stator carrier at a radially outer edge of the stator carrier.

6. The stator according to claim 5, wherein the discharge channel is fluidically connected to at least one of the cutouts at the shoulder edge of the stator carrier, and to the discharge opening at the radially outer, lower edge of the stator carrier.

7. The stator according to claim 1, further comprising a switching ring receptacle arranged at the stator, the switching ring receptacle having radially outwardly in the region of the shoulder edge of the stator carrier at least one partial area offset axially outwardly from the stator.

8. The stator according to claim 7, wherein the at least one partial area is arranged in a region of the substantially axially extending groove of the stator tooth.

9. The stator according to claim 8, wherein the switching ring receptacle has at least three switching ring receptacle pockets situated one above the other, wherein the radially outermost switching ring receiving pocket is arranged so as to be offset axially outwardly from the stator.

10. The stator according to claim 9, further comprising a retaining ring arranged on a side of the stator carrier distal the shoulder edge for axially securing the lamination stack, the retaining ring having at least one opening arranged in an area of the at least one substantially axially arranged groove of the stator tooth.

11. An electric machine for a hybrid vehicle or an electric vehicle, the electric machine comprising:
    a housing;
    the stator according to claim 1; and
    a rotor received in the housing,
    wherein the stator carrier is connected to the housing so as to be fixed with respect to rotation relative to the housing.

12. The electric machine according to claim 11, further comprising a sump trough configured to receive a coolant, the sump trough being arranged in a lower area of the housing for the coolant, the stator being surrounded in its lower area at least partially by the coolant received in the sump trough.

13. The electric machine according to claim 12, further comprising a switching ring receptacle arranged at the stator, the switching ring receptacle having radially outwardly in the region of the shoulder edge of the stator carrier at least one partial area offset axially outwardly from the stator.

14. The electric machine according to claim 1, wherein the at least one cutout in the shoulder edge of the stator carrier, the at least one substantially axially arranged groove of the stator tooth and an opening in a retaining ring provide a fluid connection channel for the coolant through the stator.

15. The electric machine according to claim 14, wherein the opening in the retaining ring is dimensioned such that a flow quantity of the coolant through the stator is definable via dimensioning of the opening in the retaining ring.

16. The electric machine according to claim 15, further comprising at least one coolant entry point comprising a coolant spray nozzle at the housing, in a region of the lamination stack, the coolant entry point being configured to introduce coolant at a coil arranged at the stator tooth and/or in a gap formed between the stator and the rotor of the electric machine.

17. The electric machine according to claim 16, wherein a coolant outlet is provided at a lowest point of the housing, which coolant outlet is preferably in fluidic contact with a discharge opening at the stator carrier.

18. The stator according to claim 1, wherein the lamination stack is formed as an integral component part.

* * * * *